(12) United States Patent
Kodukula et al.

(10) Patent No.: US 7,558,874 B1
(45) Date of Patent: Jul. 7, 2009

(54) ENERGY EFFICIENT ETHERNET VIA DYNAMIC ADAPTER DRIVER LINK SPEED NEGOTIATION

(75) Inventors: Sivarama K. Kodukula, Round Rock, TX (US); Omar Cardona, Austin, TX (US); James B. Cunningham, Austin, TX (US); Binh K. Hua, Austin, TX (US); Nicholas E. Bofferding, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/269,557

(22) Filed: Nov. 12, 2008

(51) Int. Cl.
*G06F 15/16* (2006.01)
(52) U.S. Cl. .................. 709/237; 709/233; 709/250; 713/300; 713/320; 713/322
(58) Field of Classification Search .................. 709/237
See application file for complete search history.

(56) References Cited

U.S. PATENT DOCUMENTS

| | | | |
|---|---|---|---|
| 6,442,174 | B1 | 8/2002 | Lin |
| 6,732,190 | B1 | 5/2004 | Williams et al. |
| 6,791,942 | B2 | 9/2004 | Jin |
| 7,127,521 | B2 | 10/2006 | Hsu et al. |
| 2003/0167413 | A1 | 9/2003 | Stachura et al. |
| 2003/0191854 | A1 | 10/2003 | Hsu et al. |
| 2003/0221026 | A1 | 11/2003 | Newman |
| 2004/0117674 | A1 | 6/2004 | Gutman et al. |
| 2006/0265474 | A1* | 11/2006 | Kim et al. .................. 709/218 |
| 2007/0127581 | A1 | 6/2007 | Connor et al. |

FOREIGN PATENT DOCUMENTS

| | | |
|---|---|---|
| EP | 1783951 | 5/2007 |
| JP | 2004-048532 | 12/2004 |

OTHER PUBLICATIONS

Morrissey, Peter; "The Greening of Ethernet—The IEEE wants to slash utility costs by throttling NIC power use. But will glitches derail the effort?"; 2007; *Network Computing*.
Hochmuth, Phil, "Not using all of that GigE pipe? Save some energy"; Feb. 2, 2007; Network World, as appeared at http://www.networkworld.com/news/2007/020207-ieee-energy-efficient.html.
Rock, Jason; "Ethernet's Next Move: Energy Efficiency"; Jul. 15, 2008; as appeared at http://www.epn-online.com/page/new57981/ethernet-s-next-move-energy-efficiency.html.

* cited by examiner

*Primary Examiner*—Jeffrey Pwu
*Assistant Examiner*—Shripal K Khajuria
(74) *Attorney, Agent, or Firm*—SAIDMAN DesignLaw Group

(57) ABSTRACT

A method of reducing Ethernet power consumption in a network having an operating system by reducing an Ethernet link speed to a minimum rate required for current data link traffic, and automatically commanding an Ethernet adapter/cable to decrease or increase a link rate by dynamically auto-negotiating an Ethernet port by IEEE standards to a lower or higher link rate without user intervention.

1 Claim, 1 Drawing Sheet

ENERGY EFFICIENT ETHERNET VIA DYNAMIC ADAPTER DRIVER LINK SPEED NEGOTIATION

BACKGROUND OF THE INVENTION

1. Field of the Invention

The present invention generally relates to a method of reducing Ethernet power consumption by reducing the Ethernet link speed to a minimum rate required for current link traffic. More specifically, the method includes providing a method for automatically commanding an Ethernet adapter/cable to decrease or increase a link rate by dynamically auto-negotiating the Ethernet to a lower or higher link rate without user intervention.

2. Description of the Related Art

There is increasing industry focus on energy efficiency and decreasing power consumption in datacenter or Dynamic Host Configuration Protocol (DHCP) servers. As an example, a company may lose a significant bid because their server consumes a few more watts of power than a system of a competitor. Ethernet is a pervasive technology in datacenter servers and therefore contributes to the total power consumed within the datacenter. A single datacenter server will probably contain at least one (and often multiple) Ethernet adapter(s)/cable(s). The faster the adapter/cable, the more power is consumed. Transmission protocols of 10 Mbps-100 Mbps often waste power. If the power consumed by the Ethernet adapters/cables can be decreased, the total power consumption of the server will decrease accordingly. Even a few watts of power reduction per server can be a significant savings when multiplied by the number of servers within a datacenter, which can number in the hundreds or even thousands.

Schemes have been devised such as "Energy Efficient Ethernet" which uses Adaptive Link Rate (ALR) technology to dynamically increase or reduce the link rate based on the link bandwidth requirements. Accordingly, the Ethernet link speed is adapted to match the needs of a device. When the Ethernet link rate is decreased, power consumption in the Ethernet adapter/cable and switch decreases accordingly. In checking e-mail, for instance, 100 Mb/s would be enough, but the network controller would shift to 1 Gb/s when downloading a large file. As an example, a link rate decrease from 1 gigabit/second (Gbps) to 100 megabit/second (Mbps) results in a power savings of approximately 4 watts. Ten-gigabit links—expected to be widespread by year 2010—use 10 to 20 W more power than 100 Mb/s links, while 1 Gb/s uses about 4 W more. Researchers estimate that with networking devices in homes, offices, and data centers running at 1 Gb/s, switching to 100 Mb/s whenever possible could save more than US$300 million in energy costs. The savings would be even greater if the links were switching between 10 Gb/s and 100 Mb/s. However, in addition to being time consuming (up to 2 seconds), this scheme will require a new Ethernet adapter/cable and switch hardware, or a complete redesign of the network-interface controller system, and therefore will not be compatible with the existing equipment of a customer.

Another scheme called a "low-power idle," proposes transferring data on an Ethernet link at the highest possible rate and then putting the network controller chip into a sleeplike state. However, turning on a dormant network card quickly is a challenge.

SUMMARY OF THE INVENTION

The present invention provides for a method of reducing Ethernet power consumption using existing equipment.

More specifically, in an embodiment of the present invention, the method includes reducing the Ethernet link speed to a minimum rate required for current link traffic.

In another embodiment of the present invention the method affords automatically commanding an Ethernet adapter/cable to decrease or increase a link rate by auto-negotiating the Ethernet to a lower or higher link rate without user intervention.

The method described below is compatible with existing Ethernet adapters/cables and switches because it leverages the existing capability of all nodes in a network system and supports transmission protocols such as the 10/100/1000 three-speed Base-TX Ethernet and 1 Gb/10 Gb Ethernet adapters/cables and switches to support multiple discrete link rates (10, 100, 1000 or 1000 megabits per second).

The method is implemented in the server's operating system and thus requires no changes or upgrades to existing installed Ethernet hardware.

This method of reducing Ethernet power consumption by reducing the Ethernet link speed to the minimum rate required for current link traffic provides energy efficient Ethernet via dynamic adapter driver link speed auto-negotiation.

An embodiment of the present invention may include a network having an operating system (OS), a Dynamic Host Configuration Protocol (DHCP) server, a Policy manager, a software transmit queue, a switch, an Ethernet adapter/cable capable of operating at different speeds, an adapter/cable queue, and an Ethernet port.

The method according to an embodiment of this invention includes avoiding packet loss during the renegotiation process.

Typically, customers set the link speed of their Ethernet adapters/cables and switches to the highest supported link rate, even if the adapter and switch support a lower link rate, since they want to ensure that the Ethernet will carry the maximum traffic load. However, at certain times of the day (such as the middle of the night), the traffic load can decrease dramatically such that a lower Ethernet link rate would be sufficient.

An embodiment of the present invention describes of a method whereby the operating system of a datacenter server can monitor the current traffic load on the Ethernet adapter/cable, and automatically command the Ethernet adapter/cable to decrease (or increase) the link rate by auto-negotiating the Ethernet link or port by IEEE standards to the lower (or higher) minimum transmission link rate or link speed required for current data link traffic, without user intervention.

These processes may be implemented by any combination of hardware, software or firmware.

Furthermore, embodiments of the present invention can be directed to a system and associated apparatuses where servers and processors are used. In addition, embodiments of the present invention can also be implemented as a program causing a computer to execute the above-described method. The program can be distributed via a computer-readable storage medium such as a CD-ROM.

DETAILED DESCRIPTION OF EMBODIMENTS OF THE INVENTION

Figure 1:
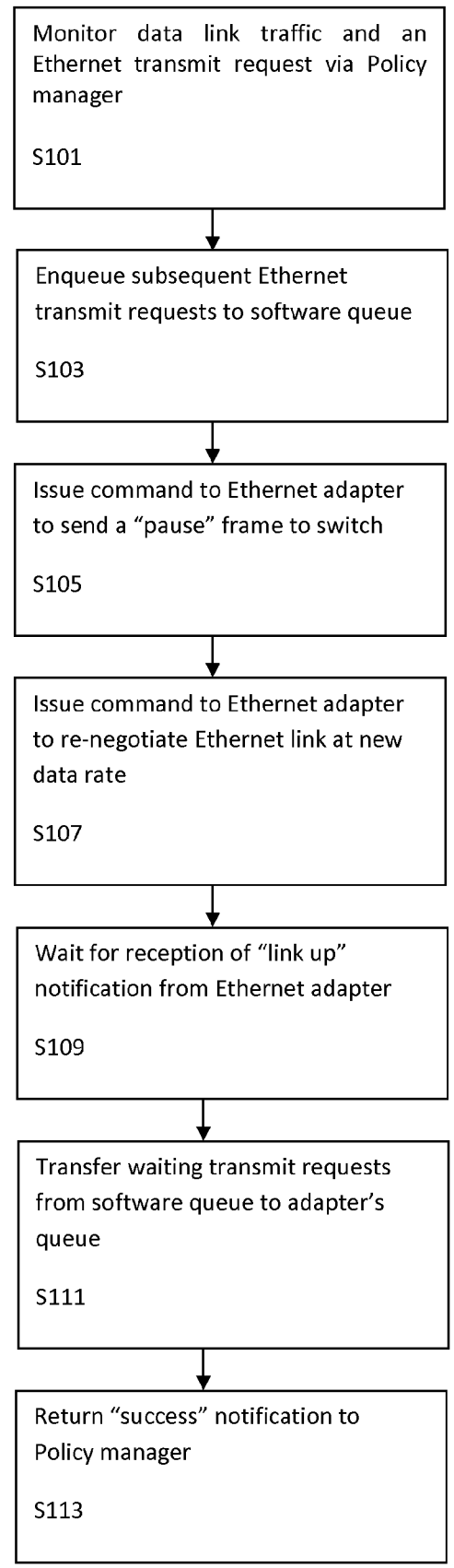
FIG. 1 is a flowchart of a method according to an embodiment of the invention.

In the description that follows, numerous details are set forth in order to provide a thorough understanding of the present invention. It will be appreciated by those skilled in the art that variations of these specific details are possible while still achieving the results of the present invention. Well-known elements and processing steps are generally not described in detail in order to avoid unnecessarily obscuring the description of the present invention.

In the drawings accompanying the description that follows, often both reference numerals and legends (labels, text descriptions) may be used to identify elements. If legends are provided, they are intended merely as an aid to the reader, and should not in any way be interpreted as limiting.

Referring to FIG. 1, the method of the present invention is described in the form of a flowchart.

In step 101, an Ethernet traffic policy manager, implemented in the operating system of a datacenter server, monitors the Ethernet link data traffic and Ethernet transmit requests and determines whether the current traffic rate can be supported by a lower link rate (or conversely, whether the current link traffic requires a higher link rate). The policy manager is user-programmable so that policy changes are made using a set of supplied rules. For example, if the current traffic rate falls below 100 Mbps (average or peak, as measured over a period of N seconds or minutes), a rule may be to change the Ethernet link rate to 100 Mbps. The user can also disable the policy manager so that the link rate remains constant regardless of data traffic. The Policy manager is also responsible for issuing the Ethernet link rate change command to the Ethernet adapter via it's device driver, via the standard architected device driver interface mechanism (for the Advanced Integrated eXecutive (AIX) UNIX operating system (OS) or any kernel, or the input/output control (ioctl) interface which is standard for any OS driver). The link rate change command contains the new link rate being requested by the Policy manager. The Policy manager controls the different speeds of the Ethernet end-to-end, supported by the network switch, and may refer to an information table to make a determination as to which speed to select. The Policy manager also monitors Ethernet transmit requests.

Further, when the device driver of the Ethernet adapter/cable receives a link rate change command, the driver consults an internal table which contains the list of supported link rates that were advertised by the Ethernet switch during the previous auto-negotiation sequence. If the requested link rate IS NOT supported by the Ethernet switch, the Policy manager is notified of the failure. If the requested link rate IS supported by the Ethernet switch, the device driver performs the following operations:

1. Enqueue subsequent Ethernet transmit requests to a software transmit queue so they can be deferred until the Ethernet link is re-established at the new rate. Step 103
2. Issue a command to the Ethernet adapter/cable from the software transmit queue to send a "PAUSE" frame to the switch. This prevents incoming packets from being dropped. IEEE 802.3x flow control is used to quiesce/suspend the network to prevent packet loss and to prevent incoming packets from being dropped when a link speed is changed during re-negotiation. Step 105
3. Issue a command to the Ethernet adapter to initiate re-negotiating the Ethernet link/port at the new data rate. This is accomplished by commanding the Ethernet adapter to advertise support ONLY for the new data rate (and not any other data rates). Step 107
4. Wait for reception of a "link up" notification from the Ethernet adapter/cable. Step 109
5. Transfer waiting Ethernet transmit requests from the software transmit queue to the adapter/cable queue. Step 111
6. Return a "SUCCESS" notification to the Policy manager. Step 113

The embodiments of the present invention are reliable and supported by IEEE dynamic auto-negotiation standards.

The method discussed above re-advertises the capability of performing at different speeds and modes of operation and forces initiating re-negotiation to achieve a desired link speed.

One embodiment of the present invention is specific about the method for throttling/bringing speeds up and down in a dynamic fashion. Algorithm and implementation details are provided by the Policy manager.

An embodiment of the present invention does not require any firmware changes on either the personal computer (PC) side or the cable plant/hybrid fiber coaxial (HFC) side.

In one embodiment of the invention, pause frames may be used, such as IEEE 802.3x pause (XOFF) frames (IEEE, Specification for 802.3 Full Duplex Operation and Physical Layer Specification for 100 Mb/s Operation on Two Pairs of Category 3 or Better Balanced Twisted Pair Cable (10BASE-T2), 1997; and later 802.3 specifications, including 1998 and 2000). While a link partner is paused, the component can go into a low power mode.

The Ethernet adapter/cable may comprise any device or devices capable of communicating via an Ethernet protocol over a physical link/port. Such devices include but are not limited to Ethernet controllers, motherboards, expansion cards, line cards, personal computers, personal digital assistants, cellular telephones, kiosks, hubs and switches. Moreover, a physical link/port may comprise one or more of any readable medium for transferring data, including coaxial cable, twisted-pair wires, fiber-optics, RF, infrared and the like. Such alternatives will be apparent to those of ordinary skill in the art.

According to the present invention, the current speed requirement can be determined and power can be adjusted in the future so that link rates are decreased for 10,000/40,000/100,000 transmission protocols and power savings of approximately 1 watt/1000 Mbps can be achieved.

While an embodiment of the invention has been described in terms of disclosed embodiments, those skilled in the art will recognize that the invention can be practiced with modification within the spirit and scope of the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of reducing power consumption in a network comprising an operating system (OS), a Dynamic Host Configuration Protocol (DHCP) server, a Policy manager, a software transmit queue, a switch, an Ethernet adapter/cable capable of operating at different speeds, an adapter/cable queue, and an Ethernet port, the method comprising:

monitoring data link traffic and an Ethernet transmit request via at least the Policy manager;

enqueuing subsequent Ethernet transmit requests to the software transmit queue to be deferred until an Ethernet link speed is re-established at a new data rate;

issuing a command to the Ethernet adapter/cable from the software transmit queue to send a "PAUSE" frame to the switch, wherein IEEE 802.3x flow control is used to quiesce/suspend the network to prevent packet loss and to prevent incoming packets from being dropped when a link speed is changed during re-negotiation;

issuing a command to the Ethernet adapter/cable to initiate re-negotiating the Ethernet port at the new data rate by commanding the Ethernet adapter/cable to advertise support ONLY for the new data rate and not for any other data rates;

waiting for reception of a "link up" notification from the Ethernet adapter/cable;

transferring waiting Ethernet transmit requests from the software transmit queue to the adapter/cable queue; and returning a "SUCCESS" notification to the Policy manager, wherein an Ethernet link speed is capable of being reduced to a minimum transmission rate required for a current data link traffic, and the Ethernet adapter/cable is automatically commanded to decrease or increase a link speed by dynamically initiating re-negotiation the Ethernet port by IEEE standards to a lower or higher link speed without user intervention.

* * * * *